(12) United States Patent
Muto

(10) Patent No.: US 6,580,711 B1
(45) Date of Patent: Jun. 17, 2003

(54) SERIAL INTERFACE CIRCUIT AND SIGNAL PROCESSING METHOD OF THE SAME

(75) Inventor: Takayasu Muto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/100,709

(22) Filed: Jun. 19, 1998

(30) Foreign Application Priority Data

Jun. 20, 1997 (JP) ............................................. 9-164808

(51) Int. Cl.⁷ .......................... H04L 12/28; H04L 12/56
(52) U.S. Cl. .................. 370/389; 370/392; 370/395.71; 370/419
(58) Field of Search ................................. 370/389, 392, 370/394, 395.1, 399, 395.71, 395.72, 409, 412, 415, 417, 419, 428, 474, 475, 476, 536, 542; 710/20, 21, 22, 56, 58, 61, 69

(56) References Cited

U.S. PATENT DOCUMENTS

| | | | | |
|---|---|---|---|---|
| 5,600,652 A | * | 2/1997 | Kreamer et al. ............ 370/396 |
| 5,737,567 A | * | 4/1998 | Whittaker et al. ..... 365/185.33 |
| 5,899,578 A | * | 5/1999 | Yanagihara et al. .......... 386/75 |
| 5,915,127 A | * | 6/1999 | Ogawa et al. ............... 370/389 |
| 5,933,430 A | * | 8/1999 | Osakabe et al. ............. 370/463 |
| 6,034,732 A | * | 3/2000 | Hirota et al. ................ 348/441 |
| 6,122,280 A | * | 9/2000 | Hamai et al. ............... 370/389 |

* cited by examiner

*Primary Examiner*—Ken Vanderpuye
*Assistant Examiner*—Phirin Sam
(74) *Attorney, Agent, or Firm*—Frommer Lawrence & Haug LLP; William S. Frommer; Darren M. Simon

(57) ABSTRACT

To provide a serial interface circuit capable of converting a large volume of data into packets based on a predetermined standard for transmission and reception and capable of performing smooth transmission and reception processing, which comprises a transaction layer circuit serving as a data processing circuit to which a storage device is connected, which reads data of the storage device, adds a self-designating transaction label, and transmits the data as a transmission asynchronous packet to a serial interface bus BS and, when transferring data of another node to the storage device, generates a request packet to which it had added a self-designating label and transmits the same to the serial interface bus BS, receives a response packet for this request packet from the another node, takes out a data portion from the response packet, and transfers this to the storage device.

28 Claims, 6 Drawing Sheets

SERIAL INTERFACE CIRCUIT AND SIGNAL PROCESSING METHOD OF THE SAME

BACKGROUND OF THE INVENTION

1. Field of the Invention

The present invention relates to a digital serial interface circuit, more particularly relates to a serial interface circuit connected to a storage apparatus such as an HDD (hard disk drive), DVD (digital versatile disk)-ROM, CD (compact disk)-ROM, and tape streamer, and to a signal processing method of the same.

2. Description of the Related Art

In recent years, as an interface for transfer of multi-media data, the IEEE (The Institute of Electrical and Electronic Engineers) 1394 high performance serial bus for realizing high speed data transfer and real time transfer has become the standard.

In the data transfer by this IEEE 1394 serial interface, the transfer operation carried out in a network is referred to as a "sub-action". Two sub-actions are prescribed.

One is an asynchronous transfer mode for making conventional requests, requesting acknowledgment, and confirming reception, while the other is an isochronous transfer mode in which the data is always sent from a certain node one time in 125 μs.

In this way, the data at an IEEE 1394 serial interface having the two transfer modes is transferred in units of packets. In the IEEE 1394 standard, however, the smallest unit of data which is handled is a quadlet (=4 bytes=32 bits).

In the IEEE 1394 standard, usually the computer data is transferred by using the asynchronous transfer mode as shown in FIGS. 5A and 5B.

The asynchronous transfer mode, as shown in FIG. 5A, includes three transition states, that is, arbitration (arb) for securing the bus, packet transmission for transferring the data, and acknowledgment (ack).

The packet transmission is executed by the format as shown in FIG. 5B.

A first quadlet of the transfer packet is comprised of a destination ID region of 16 bits, a transaction label (tl) region of 6 bits, a retry code (rt) region of 2 bits, a transaction code (tcode) region of 4 bits, and a priority (pri) region of 4 bits.

The destination ID region indicates a bus no. and a node no. of this node, while the priority region indicates a priority level.

A second quadlet and a third quadlet are comprised by a source ID region of 16 bits and a destination offset region of 48 bits.

The source ID region indicates the node ID which sent the packet, while the destination offset region is comprised by a region of continuous highs and lows and indicates an address of an address space of the destination node.

A fourth quadlet is comprised by a data length region of 16 bits and an extended transaction code (extended tcode) region of 16 bits.

The data length region indicates the number of bytes of the received packet, while the extended tcode region is a region indicating an actual lock action carried out by the data of this packet where the tcode indicates a lock transaction.

A header CRC region added to the quadlet before the data field region is an error detection code of the packet header.

Further, the data CRC region added to the quadlet after the data region (data field) is the error detection code of the data field.

Further, FIG. 6 is a view of an example of the basic configuration of an isochronous communications packet.

As shown in FIG. 6, in an isochronous communications packet, the first quadlet is the 1394 header, the second quadlet is a header CRC (Header-CRC), the third quadlet is a CIP header 1 (CIP-Header 1), the fourth quadlet is a CIP header 2 (CIP-Header 2), the fifth quadlet is a source packet header (SPH), and the sixth and subsequent quadlets are data regions. The last quadlet is a data CRC (Data-CRC) region.

The 1394 header is comprised of a data length region representing the data length, a channel region indicating the no. of the channel to be transferred by this packet (any of 0 to 63), a tcode region representing the code of processing, and a synchronous code sy prescribed by each application.

The header CRC is the error detection code of the packet header.

The CIP-Header 1 is comprised of an SID (source node ID) region for the transmission node no., a DBS (data block size) region for the length of the data block, an FN (fraction number) region for the fraction number of the data in the formation of packets, a QPC (quadlet padding count) region for the number of quadlets of padding data, an SPH region for a flag indicating the existence/nonexistence of a source packet header, and a DBC (data block continuity counter) region for the counter detecting the number of isochronous packets.

Note that the DBS region represents the number of quadlets transferred by one isochronous packet.

The CIP-Header 2 is comprised of an FMT region for the signal format indicating the type of the data to be transferred and an FDF (format dependent field) region utilized corresponding to the signal format.

The SPH header has a time stamp region in which a value obtained by adding a fixed delay value to an axis at which the transport stream packet arrives is set.

Further, the Data-CRC is the error detection code of the data field.

As explained above, in the usual transfer of computer data carried out in the asynchronous transfer mode, SBP-2 (Serial Bus Protocol-2) is used as the protocol.

According to this protocol, when data is transferred from a storage device, that is, a target, to a host computer, that is, an initiator, the transfer is carried out by writing the data from the storage device to a memory of the host computer. When data is transferred from the host computer to the target, the transfer is carried out by the storage device reading the data of the memory of the host computer.

However, no processing circuit system has yet been established for controlling a so-called "transaction layer" for converting the large volume of data to be stored in the storage device or read from the storage device into packets of the IEEE 1394 standard for transmission and reception.

Further, in a circuit system for realizing the asynchronous transfer and isochronous transfer mode, it is also necessary to configure the system so as to perform smooth reception processing in accordance with content of the data.

SUMMARY OF THE INVENTION

An object of the present invention is to provide a serial interface circuit capable of converting a large volume of data into packets based on a predetermined standard for transmission and reception and of performing smooth transmission and reception processing and a signal processing method of the same.

To attain the above object, according to a first aspect of the present invention, there is provided a serial interface circuit, for performing transmission and reception of an asynchronous packet between its own node and another node connected to its own node via a serial interface bus, having a data processing circuit for adding a self-designating label to the data read out to its own node to generate a transmission packet and transmitting the same to the serial interface bus.

Preferably, the serial interface circuit has a control circuit for receiving a control packet from another node and starting up the data processing circuit when the content of the control packet indicates a request for transfer of data from its own node to the another node.

Further, the serial interface circuit has a demultiplexing circuit for receiving a packet transferred from another node through the serial interface bus, outputting the same to the control circuit when the received packet is a control packet, and outputting the same to the data processing circuit when the received packet is a response packet with respect to a transmission packet.

According to a second aspect of the present invention, there is provided a serial interface circuit, for performing transmission and reception of an asynchronous packet between its own node and another node connected to its own node via a serial interface bus, having a data processing circuit which, when transferring the data of the another node to its own node, generates a request packet to which it has added a self-designating label, transmits the same to the serial interface bus, receives a response packet with respect to this request packet from the another node, takes out a data portion from the response packet, and transfers the same.

Preferably, the serial interface circuit has a control circuit for receiving a control packet from another node and starting up the data processing circuit when the content of the control packet indicates a request for transfer of data of the another node to its own node.

Further, the serial interface circuit has a demultiplexing circuit for receiving a packet transferred from another node through the serial interface bus, outputting the same to the control circuit when the received packet is a control packet, and outputting the same to the data processing circuit when the received packet is a response packet with respect to a transmission packet.

According to a third aspect of the present invention, there is provided a serial interface circuit, for performing transmission and reception of an asynchronous packet and an isochronous packet between its own node and another node connected to its own node via a serial interface bus, having a data processing circuit for adding a self-designating label to read data to generate a transmission packet and transmitting the same to the serial interface bus; a control circuit for receiving a control packet from the another node and starting up the data processing circuit when the content of the control packet indicates a request for transfer of data from its own node to the another node; and a demultlplexing circuit for receiving a packet transferred from the another node through the serial interface bus, outputting the same to the control circuit when the received packet is a control packet, outputting the same to the data processing circuit when the received packet is a response packet with respect to a transmission packet, and outputting the same to the application side when the received packet is isochronous stream packet data.

Preferably, the demultiplexing circuit discriminates a response packet based on the label and outputs the stream packet data to the corresponding different application sides for every channel.

According to a fourth aspect of the present invention, there is provided a serial interface circuit, for performing transmission and reception of an asynchronous packet and an isochronous packet between its own node and another node connected to its own node via a serial interface bus, having a data processing circuit which, when transferring data of the another node to its own node, generates a request packet to which it has added a self-designating label and transmits the same to the serial interface bus, receives a response packet with respect to this request packet from the another node, takes out the data portion from the response packet, and transfers the same; a control circuit for receiving a control packet from the another node and starting up the data processing circuit when the content of the control packet indicates a request for transfer of data of the another node to its own node; and a demultiplexing circuit for receiving a packet transferred from the another node through the serial interface bus, outputting the same to the control circuit when the received packet is the control packet, outputting the same to the data processing circuit when the received packet is a response packet with respect to a transmission packet, and outputting the same to the application side when the received packet is isochronous stream packet data.

Preferably, the demultiplexing circuit discriminates a response packet based on the label added to the response packet and the predetermined response code and outputs the stream packet data to the corresponding different application sides for every channel.

According to a fifth aspect of the present invention, there is provided a serial interface circuit, for performing transmission and reception of a packet, to which supply destination information has been added, between its own node and another node connected to its own node via a serial interface bus, having a demultiplexing circuit for demultiplexing a received packet based on the supply destination information of the received packet and outputting the same to the corresponding supply destination.

Preferably, the received packet is an asynchronous packet, and the supply destination information is a transaction label and transaction code information.

Alternatively, the received packet is an isochronous packet, and the supply destination information is a transaction code and channel information.

According to a sixth aspect of the present invention, there is provided a signal processing method of a serial interface circuit for performing transmission and reception of an asynchronous packet between its own node and another node connected to its own node via a serial interface bus, comprising, when transferring data of the another node to its own node, the steps of generating a request packet to which it has added a self-designating label, transmitting the same to the serial interface bus, receiving a response packet with respect to this request packet from the another node, and taking out the data portion from the response packet.

Preferably, when receiving a response packet, the data reception packet with respect to its own node is taken out based on the label added to the response packet and a predetermined response code.

According to the circuit of the present invention, in the case of for example a request from its own node to an another node for transfer of data of the storage device to the another node, the data of the storage device is read out by the data processing circuit. Then, a self-designating label is added to the read data which is then transmitted as a transmission asynchronous packet to the serial interface bus.

Further, in the present invention, the data processing circuit is started when the control circuit receives a control packet indicating a request for transfer of data from its own node to the another node.

Further, the demultiplexing circuit receives a packet transferred from the another node through the serial interface bus. When the received packet is a control packet, it is output to the control circuit, while when it is a response packet with respect to a transmission packet, it is output to the data processing circuit.

Further, according to the circuit of the present invention, when transferring data of the another node to its own node, the data processing circuit generates a request packet to which it has added a self-designating label and transmits the same to the serial interface bus.

Further, when a response packet with respect to this request packet is received from the another node, the data portion is taken out of the response packet and transferred to for example the storage device.

Further, according to the circuit of the present invention as applied to not only asynchronous communication, but also isochronous communication, the demultiplexing circuit receives the packet transferred from the another node through the serial interface bus.

When the received packet is a control packet, it is output to the control circuit, when the received packet is a response packet with respect to a transmission packet, it is output to the data processing circuit, while when the received packet is isochronous stream packet data, it is output to the application side.

Further, the demultiplexing circuit discriminates a response packet based on the label added to the response packet and a predetermined response code and outputs stream packet data to the corresponding different application sides for every channel.

Further, according to the circuit of the present invention, the demultiplexing circuit discriminates the destination of supply of the received packet based on the supply destination information of the received packet and outputs it to the corresponding supply destination.

For example, when the received packet is an asynchronous packet, it discriminates the supply destination based on a transaction label and transaction code information.

Further, when the received packet is an isochronous packet, it discriminates the destination of supply based on the transaction label and channel information.

According to the method of the present invention, when transferring data of the another node to its own node, a request packet to which it has added a self-designating label is generated and transmitted to the serial interface bus. Then, when a response packet with respect to this request packet is received from the another node, the data reception packet with respect to its own node is taken out based oh the label added to the response packet and a predetermined response code, and the data portion is taken out of the response packet.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

First Embodiment

Figure 1:
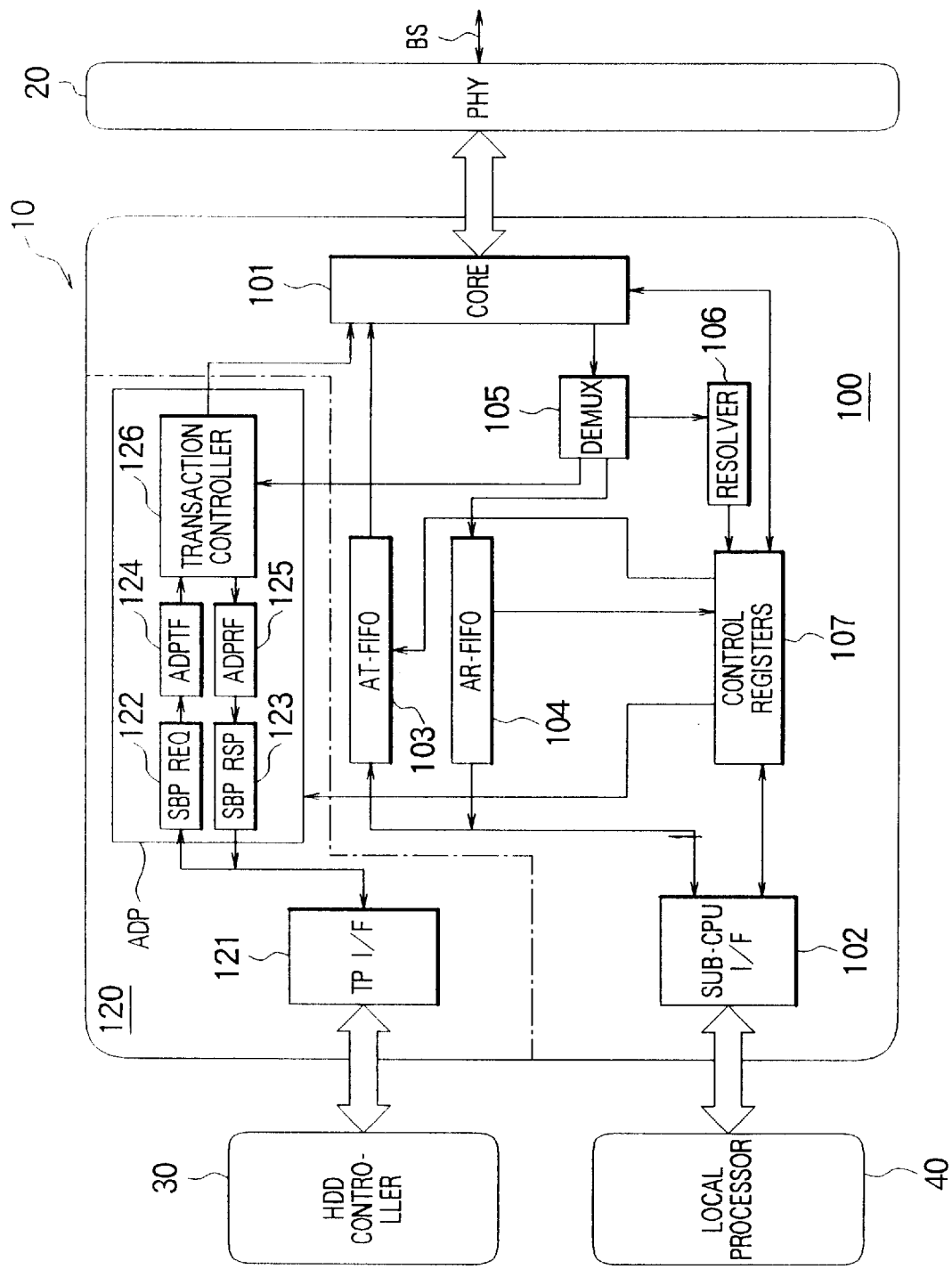
FIG. 1 is a block diagram of the configuration of a first embodiment of an IEEE 1394 serial interface circuit according to the present invention.

FIG. 1 is a block diagram of the configuration of a first embodiment of an IEEE 1394 serial interface circuit according to the present invention.

Note that this serial interface circuit is configured to perform the transfer of computer data handled in asynchronous communication. For this reason, in FIG. 1, the concrete configuration of the isochronous communication side circuit is not illustrated.

This serial interface circuit is constituted by a link/transaction layer integrated circuit 10, a physical layer circuit 20, a controller 30 of a not illustrated hard disk drive (HDD) serving as the storage device, and a local processor 40 serving as the host computer.

The link/transaction layer integrated circuit 10 is constituted by integration of a link layer circuit 100 and a transaction layer circuit 120 and performs the control of the asynchronous transfer and the control of the physical layer circuit 20 under the control of the local processor 40.

The link layer circuit 100 is constituted by, as shown in FIG. 1, a link core 101, a CPU interface circuit (Sub-CPU I/F) 102, a transmission use FIFO (AT-FIFO: First-In First-Out) 103 used in asynchronous communication, a reception use FIFO (AR-FIFO) 104 used in asynchronous communication, a demultiplexing circuit (DeMux) 105 for discriminating a received packet, a self ID use resolver 106, and a control register (hereinafter referred to as a CR) 107.

The link core 101 is constituted by a transmission circuit for an asynchronous communication use packet and isochronous communication use packet through which commands and computer data are transferred, a reception circuit, an interface circuit with the physical layer circuit 20 for directly driving the IEEE 1394 serial bus BS of these packets, a cycle timer reset at every 125 μs, a cycle monitor, and a CRC circuit.

It performs the transmission processing etc. of the computer data read from the not illustrated hard disk and formed into predetermined transmission packets at the transaction layer circuit 120.

Note that, in FIG. 1, as mentioned above, the FIFO etc. of the isochronous communication side are omitted.

The CPU interface circuit 102 performs arbitration of writing, reading, etc. of the asynchronous communication use packets between the local processor 40 and the transmission use FIFO 103 and the reception use FIFO 104 and arbitration of transmission and reception of various data between the local processor 40 and the CR 107.

For example, it transmits the control use commands of the hard disk serving as the storage device which are transmitted from the host computer serving as the initiator through the IEEE 1394 interface bus BS and stored in the reception use FIFO to the local processor 40. The data for starting up the transaction layer circuit 120 for transmitting and receiving the computer data is set from the local processor 40 in the CR 107 through the CPU interface circuit 102.

The transmission use FIFO 103 stores an asynchronous communication use packet to be transmitted to the IEEE 1394 serial bus BS. The stored data is given to the link core 101.

Further, the reception use FIFO 104 stores an asynchronous communication use packet transmitted through the IEEE 1394 serial bus, for example, the control use commands etc. of the hard disk serving as the storage device, by the demultiplexing circuit 105.

The demultiplexing circuit 105 checks the transaction code tcode and the transaction label t1 located in the first quadlet of the asynchronous communications packet via the link core 101, discriminates if this is a response packet from the initiator, that is, host computer, to the targete, that is, transaction layer circuit, or another packet, inputs only the response packet to the transaction layer circuit 120, and stores other packets in the reception use FIFO 104.

Note that, the transaction label t1 used for the discrimination check is commonly set to "a". As the tcode (transaction code), different data are set according to whether it is a write request and response or a read request and response.

More specifically, the tcode is set to "0" in the case of a write request and quadlet write, while is set to "1" in the case of a block write.

Further, it is set to "2" in the case of a write response.

In the case of a read request and quadlet read, it is set to "4", and in the case of a block read, it is set to "5".

Further, in the case of a read response, it is set to "6/7".

The resolver 106 analyzes the self ID packet transmitted through the IEEE 1394 serial bus BS and stores this in the CR 107. Further, this has also the functions of checking for errors, counting the number of nodes, etc.

The transaction layer circuit 120 has the function of automatically transmitting and receiving the data of computer peripherals (hard disk drives in the present embodiment) as asynchronous packets based on the SBP-2 (Serial Bus Protocol-2) standard.

Further, the transaction layer circuit 120 is provided with a retry function and a split timeout detection function.

The retry function is a function of retransmitting the corresponding request packet where an "ack busy*" Ack code is returned after transmitting a request packet. When the packet is retransmitted, the transmission is performed after setting the rt region of 2 bits located in the first quadlet of the transmission packet from "00" to "01".

The split timeout detection function is a function for detecting when the time for the return of the response packet runs out.

This transaction layer circuit 120 is constituted by a transport data interface circuit 121, a request packet generation circuit (SBPreq) 122, a response packet decode circuit (SBPRsp) 123, a request use FIFO (Request FIFO: ADPTF) 124, a response use FIFO (Response FIFO: ADPRF) 125, and a transaction controller 126.

A data processing circuit ADP is constituted by the request packet generation circuit (SBPreq) 122, response packet decode circuit (SBPRsp) 123, request use FIFO (Request FIFO: ADPTF) 124, response use FIFO (Response FIFO: ADPRF) 125, and the transaction controller 126.

The transport data interface circuit 121 performs arbitration of transmission and reception of data between the HDD controller 30 and the request packet generation circuit 122 and the response packet decode circuit 123.

When receiving an instruction for startup of the data transfer from the CR 107 of the link layer circuit 100, in the case of transmission (writing), the request packet generation circuit 122 divides the computer data recorded on a not illustrated hard disk, obtained via the transport data interface circuit 121, according to the SBP-2 standard into one or more blocks of data so that it can be divided into packets, adds a 1394 header designating the transaction label t1 (=a), and stores the same in the request use FIFO 124.

Further, in the case of reception (reading), it forms the 1394 block read request command of the designated address and data length into a packet by designating one or more transaction labels t1 (=a) or the like according to the SBP-2 standard and stores the same in the request use FIFO 124.

The response packet decode circuit 123 reads the response packet data stored in the response use FIFO 125 at the time of reception, removes the 1394 header from the response packet, and outputs the read data via the transport data interface circuit 121 to the HDD controller 30 at a predetermined timing.

The request use FIFO 124, in the case of transmission (writing), stores the transmission data divided into packets and, In the case of reception (reading), stores the 1394 block read request command.

The response use FIFO 125 stores the reception data transmitted from the host computer side through the 1394 serial bus BS.

The trans action controller 126 reads the transmission data divided into packets stored in the request use FIFO 124 at the time of transmission and the 1394 block read request command stored in the request use FIFO 124 at the time of reception and controls the output to the link core 101 of the link layer circuit 100.

Further, at the time of transmission, upon receipt of a response packet from the demultiplexing circuit 105 of the link layer circuit 100, th e retry code rcode thereof is written into the CR 107. At the time of reception, the 1394 header is removed from the response packet from the demultiplexing circuit 105, and the packet data is stored in the response use FIFO 125.

Next, an explanation will be given of the transmission and reception operations of computer data when packets determined by the SBP-2 standard are transferred In the above configuration.

First, an explanation will be given of the transmission operation, that is, a case when the data is transferred from the target, that is, hard disk, to the initiator, that is, host computer, and when the operation of writing the data into the memory of the host computer from the storage device (hard disk) is carried out.

The packet data such as the ORB (operation request block) based on the SBP-2 standard transferred from the host computer through the 1394 serial bus BS is input to the demultiplexing circuit 105 via the physical layer circuit 20 and the link core 101 of the link layer circuit 100.

The demultiplexing circuit 105, upon receipt of the received packet, discriminates whether the packet is a response packet with respect to the target, that is, transaction layer circuit, from the host computer or another packet.

Then, in this case, since it is another packet, the received data is stored in the reception use FIFO 104.

The received data such as ORB stored in the reception use FIFO 104 is input to the local processor 40 via the CPU interface circuit 102.

The local processor 40 initializes the transaction layer circuit use register of the CR 107 according to the contents of the ORB via the CPU interface circuit 102.

By this, the transaction layer circuit 120 is started up.

In the started up transaction layer circuit 120, the request packet generation circuit 122 starts to request data to the HDD controller 30 via the transport data interface circuit 121.

According to the request, the transmission data sent via the transport data interface circuit 121 is divided into one or more blocks of data so that it can be divided into packets according to the SBP-2 standard in the request packet generation circuit 122. A 1394 header having a designated transaction label t1 (=a) or the like is added and the result is automatically stored in the request use FIFO 124.

When data of one 1394 packet size or more is stored in the request use FIFO 124, the data is sent to the link core 101 of the link layer circuit 100 by the transaction controller 126.

Then, the link core 101 applies arbitration to the 1394 serial bus BS via the physical layer circuit 20.

By this, if the bus can be secured, a write request packet containing the transfer data is transmitted to the host computer via the physical layer circuit 20 and the 1394 serial bus BS.

After transmission, an Ack code with respect to the write request packet and, in certain cases, the write response packet is sent from the host computer and input to the demultiplexing circuit 105 via the physical layer circuit 20 and the link core 101 of the link layer circuit 100.

In the demultiplexing circuit 105, a check of the transaction code tcode and the transaction label t1 of the received packet is carried out, and when it is discriminated that the received packet is the response packet with respect to the transaction layer circuit as the target from the host computer, the response packet is input to the transaction controller 126 of the transaction layer circuit 120.

The transaction controller 126 transmits the next data to the link core 101 if the Ack code and the response code of the input response packet are normal.

The above operation is repeated to write (transmit) the computer data to the memory of the host computer.

Figure 2:
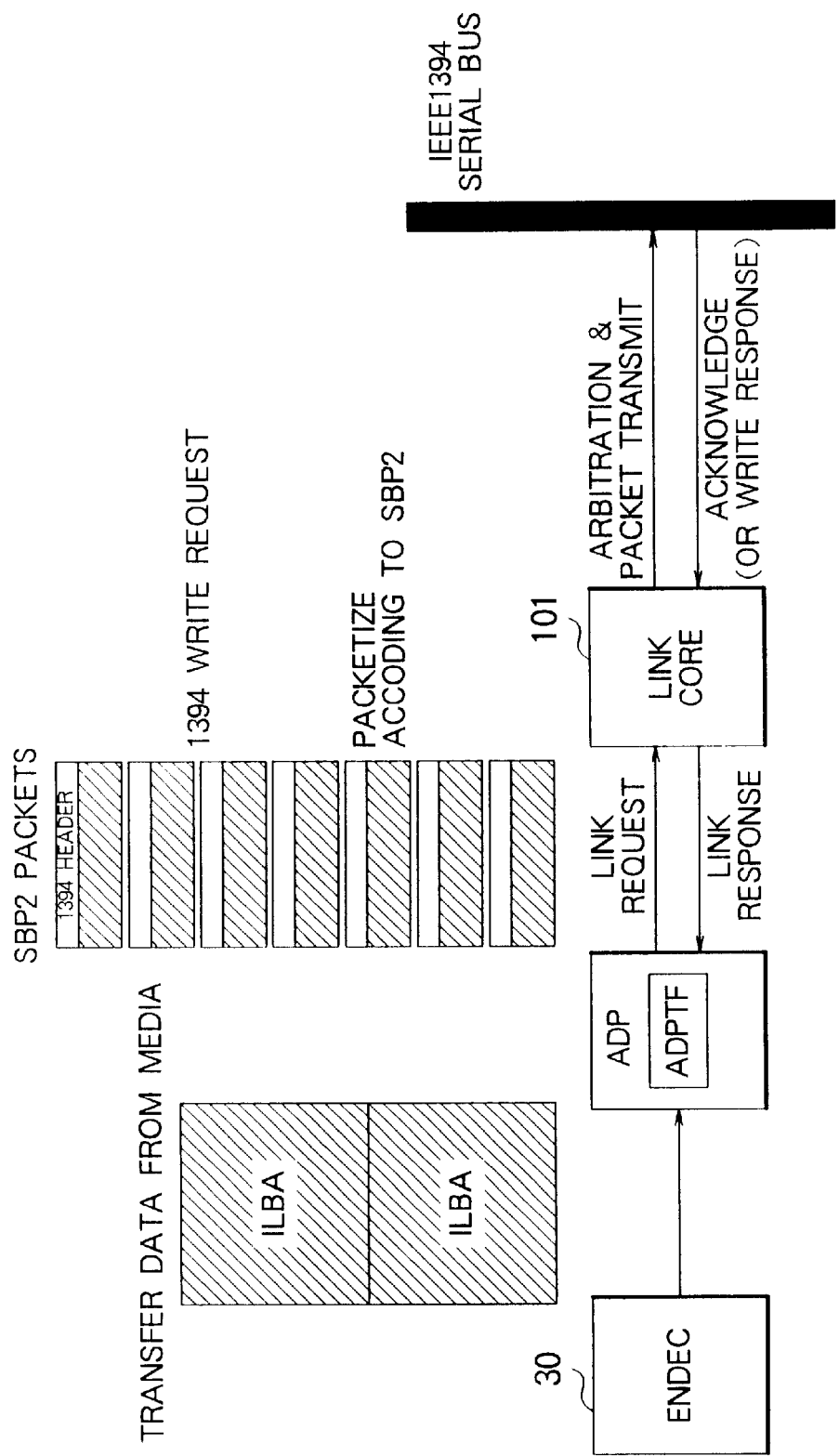
FIG. 2 is a view showing in brief a transmission operation in a transaction layer circuit according to the present invention.

An outline of the operation of the transaction layer circuit 120 in the above transmission is shown in FIG. 2.

Next, an explanation will be given of the reception operation, that is, a case when transferring data from the host computer to the target and when the storage device (hard disk) performs the operation for reading the data of the memory of the host computer.

The packet data such as the ORB based on the SBP-2 standard transferred from the host computer through the 1394 serial bus BS is input to the demultiplexing circuit 105 via the physical layer circuit 20 and the link core 101 of the link layer circuit 100.

The demultiplexing circuit 105 receives the received packet and discriminates whether the received packet is a response packet with respect to the target, that is, transaction layer circuit, from the host computer or another packet.

Then, in this case, since the received packet is another packet, the received data is stored in the reception use FIFO 104.

The received data such as the ORB stored in the reception use FIFO 104 is input to the local processor 40 via the CPU interface circuit 102.

The local processor 40 initializes the transaction layer circuit use register of the CR 107 according to the content of the ORB via the CPU interface circuit 102.

By this, the transaction layer circuit 120 is started up.

In the activated transaction layer circuit 120, in the request packet generation circuit 122 forms the 1394 block read request command of the designated address and data length into a packet according to the SBP-2 standard and stores the same in the request use FIFO 124.

The read request command packet stored in the request use FIFO 124 is sent to the link core 101 of the link layer circuit 100 by the transaction controller 126.

Then, the link core 101 applies arbitration to the 1394 serial bus BS via the physical layer circuit 20.

By this, when the bus can be secured, the read request packet is transmitted to the host computer via the physical layer circuit 20 and the 1394 serial bus BS.

After transmission, an Ack code with respect to the read request packet and the read response packet containing the data of the designated data length are sent from the host computer and input to the demultiplexing circuit 105 via the physical layer circuit 20 and the link core 101 of the link layer circuit 100.

The demultiplexing circuit 105 checks the transaction code tcode and the transaction label t1 of the received packet. When it determines that the received packet is a response packet with respect to the target, that is, the transaction layer circuit, from the host computer, it inputs the response packet to the transaction controller 126 of the transaction layer circuit 120.

The transaction controller 126 stores the response packet data from the demultiplexing circuit 105 in the response use FIFO 125.

The data stored in the response use FIFO 125 is read by the response packet decode circuit 123, the 1394 header is removed, and the resultant data is output to the HDD controller 30 via the transport data interface circuit 121 at a predetermined timing.

The above operation is repeated to write (receive) the computer data to the storage device (hard disk).

Figure 3:
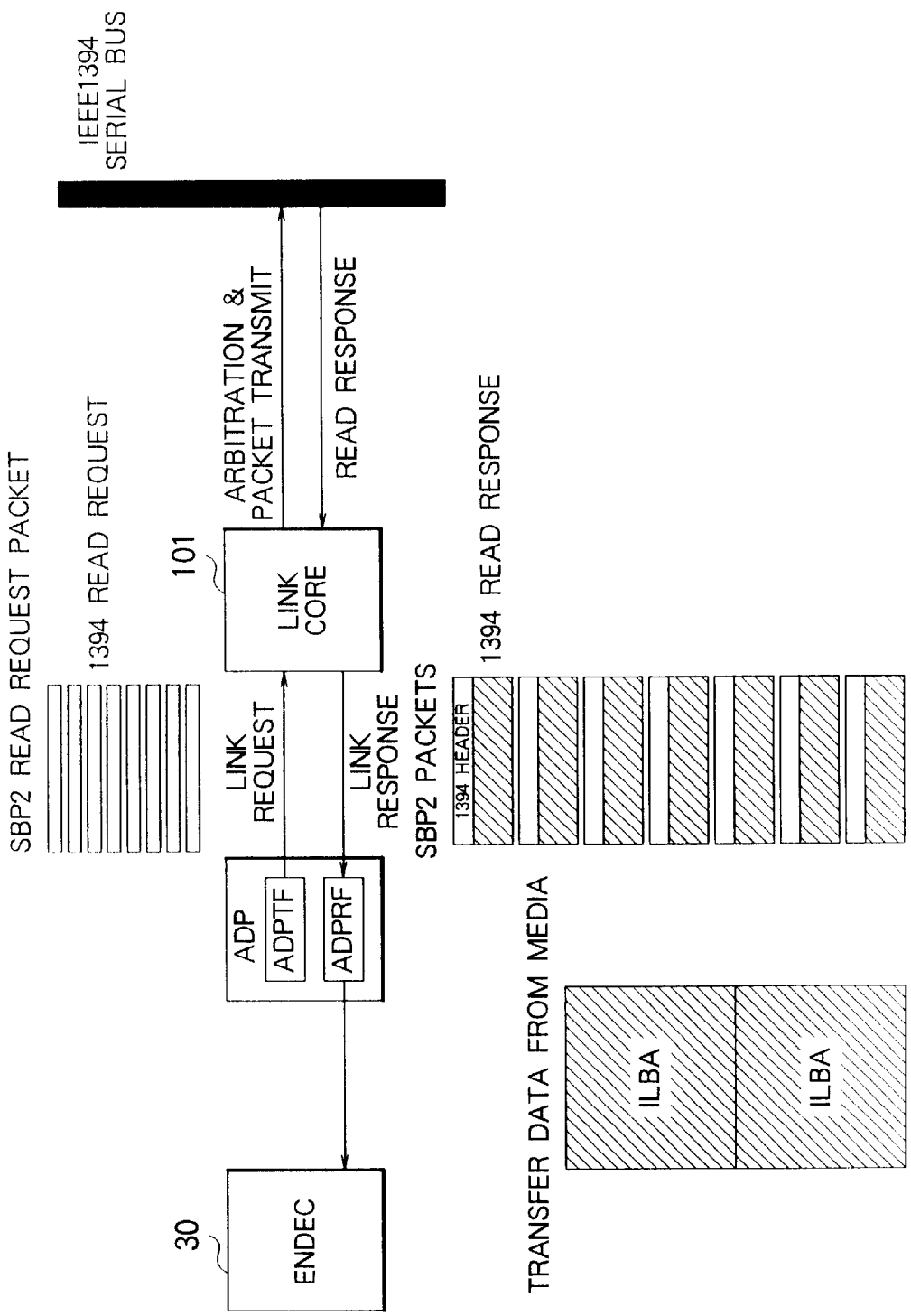
FIG. 3 is a view showing in brief a reception operation in a transaction layer circuit according to the present invention.

An outline of the operation of the transaction layer circuit 129 in the above reception is shown in FIG. 3.

As explained above, according to the first embodiment, since provision is made of a transaction layer circuit 120 serving as a data processing circuit to which a storage device is connected, which reads data of the storage device, adds a self-designating transaction label, and transmits the data as a transmission asynchronous packet to a serial interface bus BS and, when transferring data of another node to the storage device, generates a request packet to which it had added a self-designating label and transmits the same to the serial interface bus BS, receives a response packet for this request packet from the another node, takes out a data portion from the response packet, and transfers this to the storage device, it is possible to transmit and receive a large volume of data stored in the storage device or read from the storage device in IEEE 1394 packets based on the SBP-2 standard and possible to realize large volume data transfer by using IEEE 1394 serial bus interface asynchronous packets.

Further, the sequence based on the SBP-2 standard of fetching the ORB, transferring the data, and transmitting the status to the initiator can be simplified and optimum design becomes possible when connecting a disk driver, tape streamer, or other computer peripheral to an IEEE 1394 serial bus.

Further, since the request use FIFO 124 and the response use FIFO 125 are provided in the transaction layer circuit 120 and the transmission use FIFO 103 and the reception use FIFO 104 are provided in the link layer circuit 100, the transmission and reception of usual 1394 packets other than data can be carried out in parallel to the transfer of data by the request use FIFO 124 and the response use FIFO 125.

Further, since provision is made of the demultiplexing circuit 105 which checks the transaction code tcode and the transaction label t1 located in the first quadlet of the asynchronous communications packet via the link core 101, discriminates whether the received packet is a response packet with respect to the target, that is, the transaction layer circuit, from the initiator, that is, the host computer, or another packet, inputs only the response packet to the transaction layer circuit 120, and stores the other packets in the reception use FIFO 104, even if a critical error occurs at for example the transaction layer circuit 120 side and the read/write operation of data stops, there is the advantage that reading of the commands input after the data will not become impossible and therefore that commands can be smoothly received regardless of the state of the read/write operation of the data.

Second Embodiment

Figure 4:
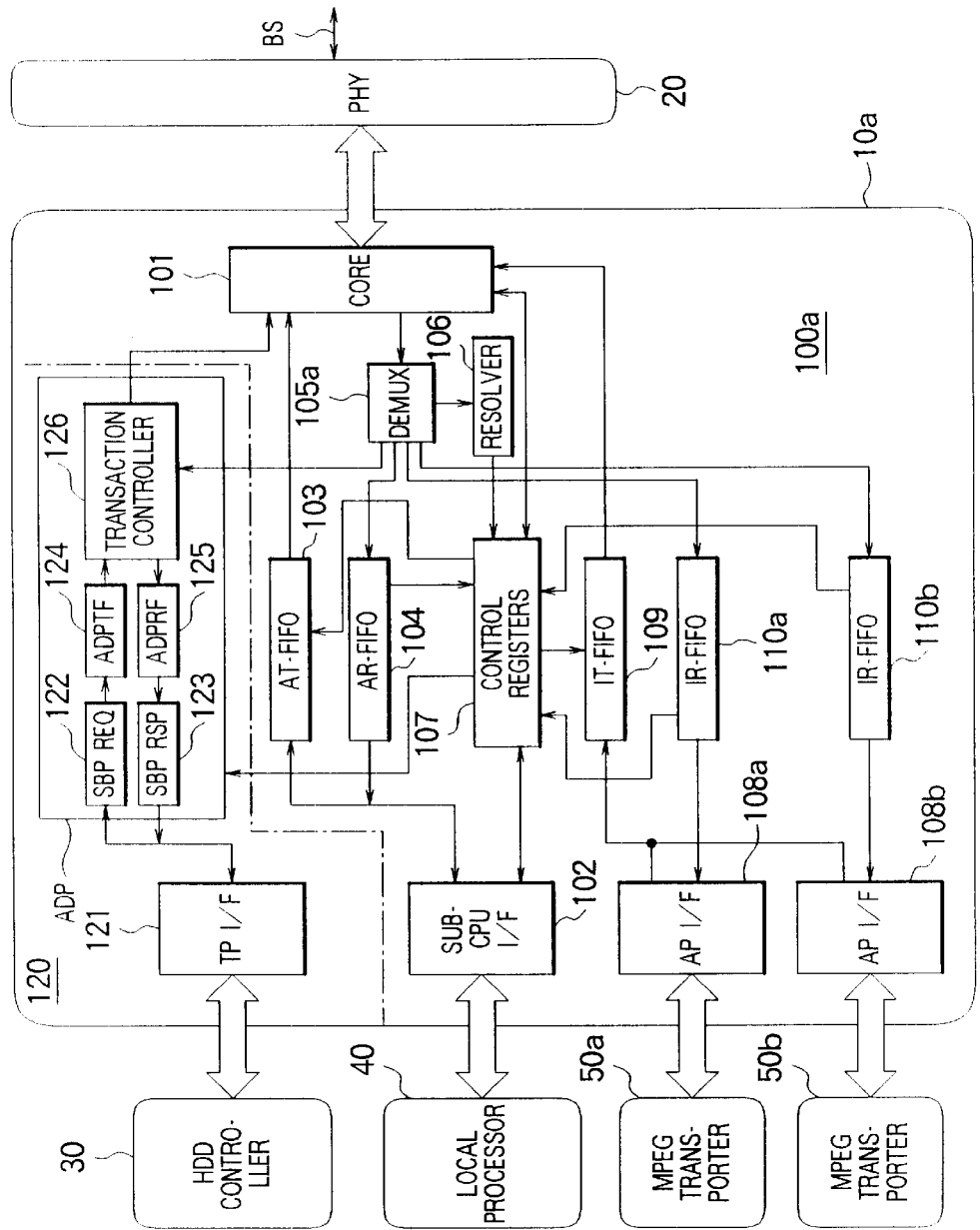
FIG. 4 is a block diagram of the configuration of a second embodiment of the IEEE 1394 serial interface circuit according to the present invention.
Figures 5A, 5B:
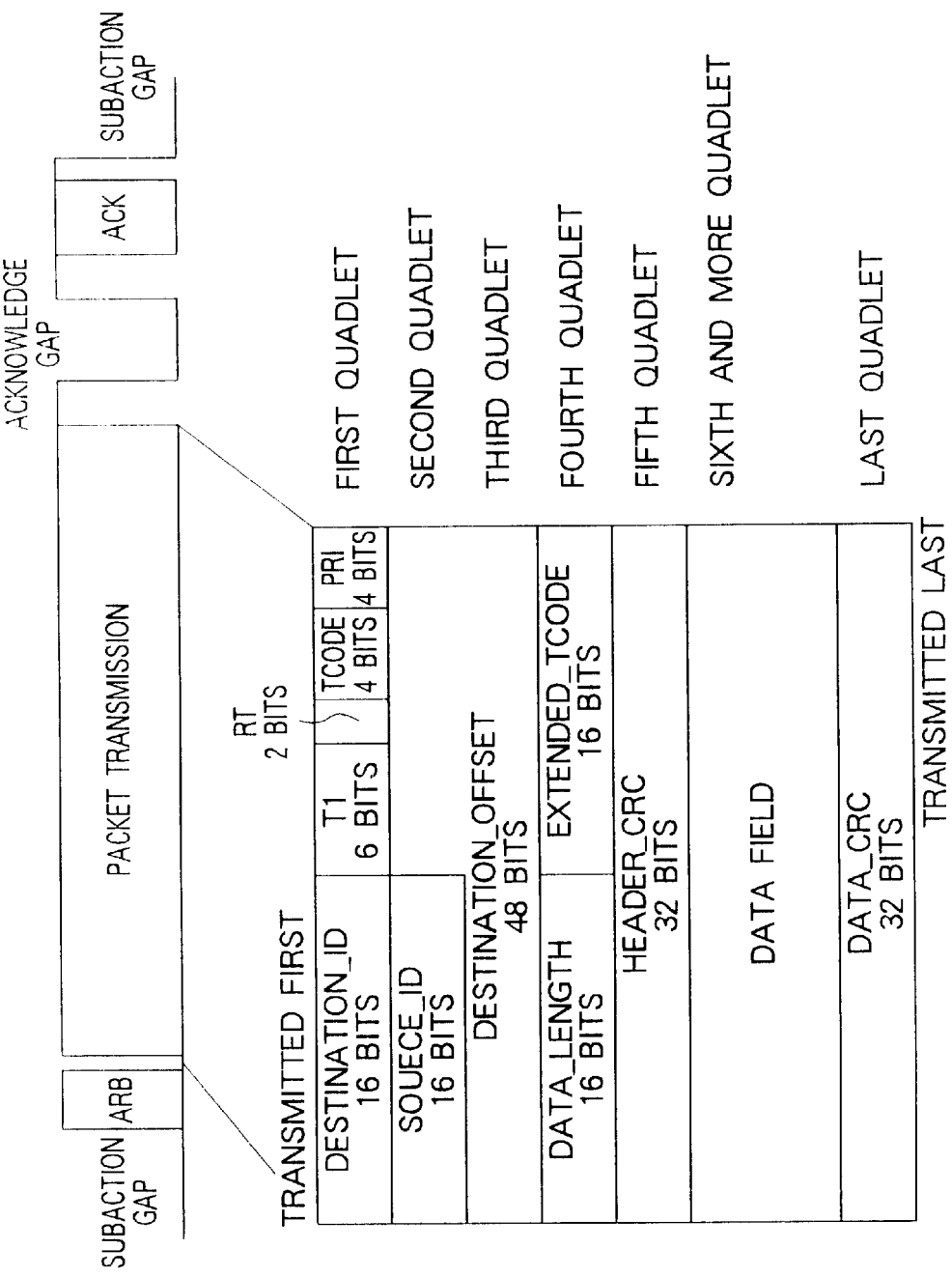
FIGS. 5A and 5B are views explaining an asynchronous transfer of the IEEE 1394 standard.
Figure 6:
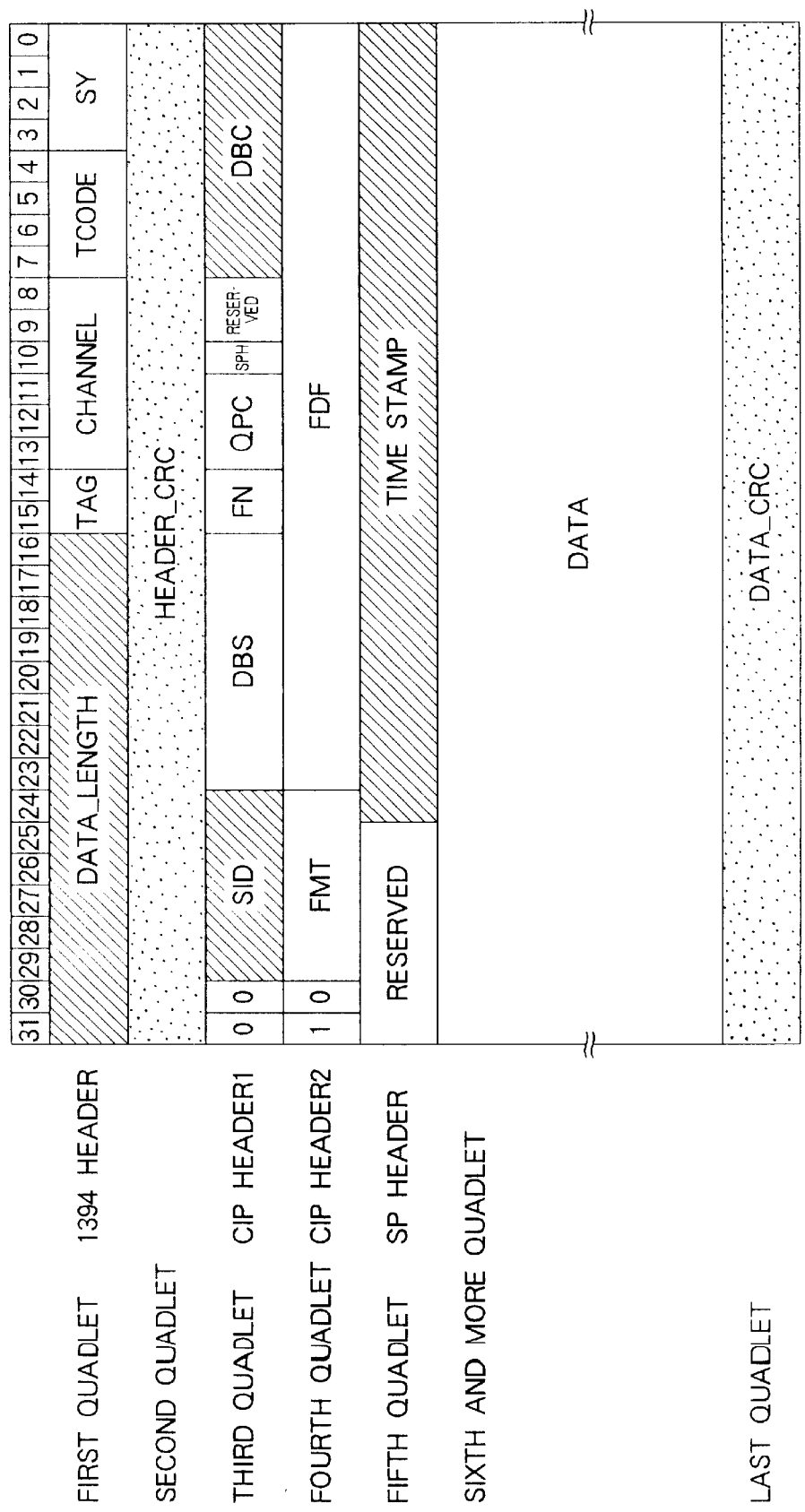
FIG. 6 is a view of an example of the basic configuration of an isochronous communications packet.

FIG. 4 is a block diagram of the configuration of a second embodiment of the IEEE 1394 serial interface circuit according to the present invention.

In FIG. 4, 10a indicates a link/transaction layer integrated circuit, 20 a physical layer circuit, 30 an HDD controller, 40 a local processor, and 50a and 50b indicate MPEG (Moving Picture Experts Group) transporters.

The link/transaction layer integrated circuit 10a is constituted by the link layer circuit 10a and the transaction layer circuit 120.

The link layer circuit 100a is constituted by a link core 101, a CPU interface circuit 102, an asynchronous transmission use FIFO 103, an asynchronous reception use FIFO 104, a demultiplexing circuit 105a, a resolver 106, a control register (CR) 107, application interface circuits 108a and 108b, an isochronous transmission use FIFO 109, and isochronous reception use FIFOs 110a and 110b.

Further, the transaction layer circuit 120 is constituted by, similar to FIG. 1, the transport data interface circuit 121, request packet generation circuit (SBPreq) 122, response packet decode circuit (SBPRsp) 123, request use FIFO (Request FIFO: ADPTF) 124, response use FIFO (Response FIFO: ADPRF) 125, and the transaction controller 126.

The difference of the second embodiment from the first embodiment resides in that the link/transaction layer circuit handles not only data of the asynchronous communication mode and usual 1394 packet, but also isochronous communication use data.

More specifically, the demultiplexing circuit 105a in the link layer circuit 100a of the link/transaction layer circuit 10a, in the same way as in the case of FIG. 1, checks the transaction code tcode and transaction label t1 of the asynchronous communications packet via the link core 101, discriminates whether a received packet is a response packet with respect to the target, that is, the transaction layer circuit, from the initiator, that is, the host computer, or another packet, inputs only the response packet to the transaction layer circuit 120 and stores the other packets in the reception use FIFO 104. When receiving an isochronous communications packet, it decodes the tcode region and the channel region indicating the no. of the channel (any of 0 to 63) for the packet transfer in the header information of the 1394 packet and selectively stores the same in the reception use FIFOs 108a and 108b provided corresponding to the channels.

Further, the application interface circuit (API/F) 108a performs the arbitration of the transmission and reception of the MPEG transport stream data containing the clock signal, control signal, etc. between the MPEG transporter 50a and the transmission use FIFO 108 and reception use FIFO 110a.

The application interface circuit 108b performs the arbitration of the transmission and reception of the MPEG transport stream data containing the clock signal, control signal, etc. between the MPEG transporter 50b and the transmission use FIFO 109 and reception use FIFO 110b.

In the above configuration, when for example an isochronous communication use packet is received, the demultiplexing circuit 105a decodes the tcode region and the channel region indicating the no. of the channel (any of 0 to 63) for the packet transfer in the header information of the 1394 packet and selectively stores the same in the reception use FIFOs 108a and 108b provided corresponding to the channels.

Then, the transmission and reception of the MPEG transport stream data with the MPEG transporter 50a or 50b is carried out via the application interface circuit 108a or 108b.

In the second embodiment as well, similar effects to those by the first embodiment can be obtained.

Note that, in the above embodiments, the explanation was made taking as an example a circuit structure in which the demultiplexing circuits 105 and 105a were provided between the link core 101 and the reception use FIFO's 104, 110a, and 110b in the link layer circuits 100 and 100a, but needless to say the present invention can also be applied to a circuit configuration in which they are provided on the data output side of the interface circuit of for example the reception side FIFO.

As explained above, according to the present invention, a serial interface circuit capable of converting a large volume of data into packets based on a predetermined standard for transmission and reception and capable of performing smooth transmission and reception processing can be realized.

While the invention has been described with reference to specific embodiments chosen for purposes of illustration, it should be apparent that numerous modifications could be made thereto by those skilled in the art without departing from the basic concept and scope of the invention.

What is claimed is:

1. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit; and a data processing circuit comprising a first storage means and a second storage means, which, when transferring the data of another node to its own node, generates a request packet to which it has added a self-designating label, stores the generated request packet in the first storage means, transmits the stored request packet to the serial interface bus at a predetermined timing, receives a response packet with respect to this request packet from the another node, extracts a data portion from the response packet, stores the received data in the second storage means, and transfers the stored received data to said external device at a predetermined timing.

2. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit; and a data processing circuit comprising a first storage means and a second storage means, which, when transferring the data of another node to its own node, generates a plurality of request packets to which it has added self-designating labels, stores the generated request packets in the first storage means, transmits the stored request packets to the serial interface bus at a predetermined timing, receives response packets with respect to these request packets from the another node, extracts data portions from the response packets, stores the received data in the second storage means, and transfers the stored received data to said external device at a predetermined timing.

3. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit;

a data processing circuit comprising a first storage means and a second storage means, which, when transferring the data of another node to its own node, generates a request packet to which it has added a self-designating label, stores the generated request packet in the first storage means, transmits the stored request packet to the serial interface bus at a predetermined timing, receives a response packet with respect to this request packet from the another node, extracts a data portion from the response packet, stores the received data in the second storage means, and transfers the stored received data to said external device at a predetermined timing; and wherein said data processing circuit receives a response packet with respect to a transmission packet from said another node and, when normal, transmits the next request packet to said serial interface bus.

4. A serial interface circuit as set forth in claim 3, further comprising a control circuit for receiving a control packet from another node and starting up the data processing circuit when the content of the control packet indicates a request for transfer of data of the another node to its own node.

5. A serial interface circuit as set forth in claim 4, further comprising a demultiplexing circuit for receiving a packet transferred from another node through the serial interface bus, outputting the same to the control circuit when the received packet is a control packet, and outputting the same to the data processing circuit when the received packet is a response packet with respect to a transmission packet.

6. A serial interface circuit as set forth in claim 5, further comprising a reception use storage means between said demultiplexing circuit and control circuit, said demultiplexing circuit storing the demultiplexed control packet in said reception use storage means, and said control circuit reading the control packet stored in said reception use storage means.

7. A serial interface circuit as set forth in claim 6, wherein a transmission use storage means is connected to said control circuit, said control circuit stores the control packet in said transmission use storage means, and further comprising a circuit for transmitting a transmission use control packet stored in said transmission use storage means to said serial interface bus at a predetermined timing.

8. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit;

a data processing circuit for adding a self-designating label to data from said storage device, generating a transmission packet and transmitting the transmission packet to the serial interface bus; and when transferring the data of the another node to its own node, generating a request packet to which it has added a self-designating label, transmitting this request packet to the serial interface bus, receiving a response packet with respect to the request packet from the another node, extracting a data portion from the response packet, and transferring the extracted data portion to said external device; and;

wherein said data processing circuit comprises a first storage means and a second storage means, stores the generated request packet in the first storage means, transmits the stored request packet to the serial interface bus at a predetermined timing, stores the received data in the second storage means, and transfers the stored received data at a predetermined timing.

9. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit;

a data processing circuit for adding a self-designating label to data from said storage device, generating a transmission packet and transmitting the transmission packet to the serial interface bus; and when transferring the data of the another node to its own node, generating a request packet to which it has added a self-designating label, transmitting this request packet to the serial interface bus, receiving a response packet with respect to the request packet from the another node, extracting a data portion from the response packet, and transferring the extracted data portion to said external device;

wherein said data processing circuit divides the read data into a plurality of data blocks, adds the above label to each data block, and transmits the same as transmission asynchronous packets to the serial interface circuit and, when transferring data of the another node to its own node, generates a plurality of request packets with designated labels and transmits the same to the serial interface bus to enable transfer of the data in packets and;

wherein said data processing circuit comprises a first storage means and a second storage means, stores the generated request packet in the first storage means, transmits the stored request packet to the serial interface bus at a predetermined timing, stores the received data in the second storage means, and transfers the stored received data at a predetermined timing.

10. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit;

a data processing circuit for adding a self-designating label to data from said storage device, generating a transmission packet and transmitting the transmission packet to the serial interface bus; and when transferring the data of the another node to its own node, generating a request packet to which it has added a self-designating label, transmitting this request packet to the serial interface bus, receiving a response packet with respect to the request packet from the another node, extracting a data portion from the response packet, and transferring the extracted data portion to said external device; and;

wherein said data processing circuit comprises a first storage means and a second storage means, stores the generated request packet in the first storage means, transmits the stored request packet to the serial interface bus at a predetermined timing, stores the received data in the second storage means, and transfers the stored received data at a predetermined timing; and wherein said data processing circuit receives a response packet with respect to a transmission packet from said another node and, when normal, transmits the next transmission packet to said serial interface bus.

11. A serial interface circuit as set forth in claim 10, further comprising a control circuit for receiving a control packet from another node and starting up the data processing circuit when the content of the control packet indicates a request for transfer of data from its own node to the another node and when it indicates a request for transfer of data of the another node to its own node.

12. A serial interface circuit as set forth in claim 11, further comprising a demultiplexing circuit for receiving a packet transferred from another node through the serial interface bus, outputting the same to the control circuit when the received packet is a control packet, and outputting the same to the data processing circuit when the received packet is a response packet with respect to a transmission packet.

13. A serial interface circuit as set forth in claim 12, further comprising a reception use storage means between said demultiplexing circuit and control circuit, said demultiplexing circuit storing the demultiplexed control packet in said reception use storage means, and said control circuit reading the control packet stored in said reception use storage means.

14. A serial interface circuit as set forth in claim 13, wherein a transmission use storage means is connected to said control circuit, said control circuit stores the control packet in said transmission use storage means, and further comprising a circuit for transmitting a transmission use control packet stored in said transmission use storage means to said serial interface bus at a predetermined timing.

15. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit; and a data processing circuit comprising a first storage device and a second storage device, which, when transferring the data of another node to its own node, generates a request packet to which it has added a self-designating label, stores the generated request packet in the first storage device, transmits the stored request packet to the serial interface bus at a predetermined timing, receives a response packet with respect to this request packet from the another node, extracts a data portion from the response packet, stores the received data in the second storage device, and transfers the stored received data to said external device at a predetermined timing.

16. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit; and a data processing circuit comprising a first storage device and a second storage device, which, when transferring the data of another node to its own node, generates a plurality of request packets to which it has added self-designating labels, stores the generated request packets in the first storage device, transmits the stored request packets to the serial interface bus at a predetermined timing, receives response packets with respect to these request packets from the another node, extracts data portions from the response packets, stores the received data in the second storage device, and transfers the stored received data to said external device at a predetermined timing.

17. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit;

a data processing circuit comprising a first storage device and a second storage device, which, when transferring the data of another node to its own node, generates a request packet to which it has added a self-designating label, stores the generated request packet in the first storage device, transmits the stored request packet to the serial interface bus at a predetermined timing, receives a response packet with respect to this request packet from the another node, extracts a data portion from the response packet, stores the received data in the second storage device, and transfers the stored received data to said external device at a predetermined timing; and wherein said data processing circuit receives a response packet with respect to a transmission packet from said another node and, when normal, transmits the next request packet to said serial interface bus.

18. A serial interface circuit as set forth in claim 17, further comprising a control circuit for receiving a control packet from another node and starting up the data processing circuit when the content of the control packet indicates a request for transfer of data of the another node to its own node.

19. A serial interface circuit as set forth in claim 18, further comprising a demultiplexlng circuit for receiving a packet transferred from another node through the serial interface bus, outputting the same to the control circuit when the received packet is a control packet, and outputting the same to the data processing circuit when the received packet is a response packet with respect to a transmission packet.

20. A serial interface circuit as set forth in claim 19, further comprising a reception use storage device between said demultiplexing circuit and control circuit, said demultiplexing circuit storing the demultiplexed control packet in said reception use storage device, and said control circuit reading the control packet stored in said reception use storage device.

21. A serial interface circuit as set forth in claim 20, wherein a transmission use storage device is connected to said control circuit, said control circuit stores the control packet in said transmission use storage device, and further comprising a circuit for transmitting a transmission use control packet stored in said transmission use storage device to said serial interface bus at a predetermined timing.

22. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit;

a data processing circuit for adding a self-designating label to data from said storage device, generating a transmission packet and transmitting the transmission packet to the serial interface bus; and when transferring the data of the another node to its own node, generating a request packet to which it has added a self-designating label, transmitting this request packet to the serial interface bus, receiving a response packet with respect to the request packet from the another node, extracting a data portion from the response packet, and transferring the extracted data portion to said external device; and;

wherein said data processing circuit comprises a first storage device and a second storage device, stores the generated request packet in the first storage device, transmits the stored request packet to the serial interface bus at a predetermined timing, stores the received data in the second storage device, and transfers the stored received data at a predetermined timing.

23. A serial interface circuit for performing transmission and reception of an asynchronous packet between its own node and another node connected to its own node via a serial interface bus, comprising:

a first interface for transferring data directly between the serial interface circuit and a storage device of an external device connected to said serial interface circuit;

a second interface for transferring commands and data directly between the serial interface circuit and a processor of said external device connected to said serial interface circuit;

a data processing circuit for adding a self-designating label to data from said storage device, generating a transmission packet and transmitting the transmission packet to the serial interface bus; and when transferring the data of the another node to its own node, generating a request packet to which it has added a self-designating label, transmitting this request packet to the serial interface bus, receiving a response packet with respect to the request packet from the another node, extracting a data portion from the response packet, and transferring the extracted data portion to said external device;

wherein said data processing circuit divides the read data into a plurality of data blocks, adds the above label to each data block, and transmits the same as transmission asynchronous packets to the serial interface circuit and, when transferring data of the another node to its own node, generates a plurality of request packets with designated labels and transmits the same to the serial interface bus to enable transfer of the data in packets and;

wherein said data processing circuit comprises a first storage device and a second storage device, stores the generated request packet in the first storage device, transmits the stored request packet to the serial interface bus at a predetermined timing, stores the received data in the second storage device, and transfers the stored received data at a predetermined timing.

24. A serial interface circuit for performing transmission and reception of an asynchronous packet between its own node and another node connected to its own node via a serial interface bus, comprising:
- a first interface for transferring data directly between the serial interface circuit and a storage device of an external device connected to said serial interface circuit;
- a second interface for transferring commands and data directly between the serial interface circuit and a processor of said external device connected to said serial interface circuit;
- a data processing circuit for adding a self-designating label to data from said storage device, generating a transmission packet and transmitting the transmission packet to the serial interface bus; and when transferring the data of the another node to its own node, generating a request packet to which it has added a self-designating label, transmitting this request packet to the serial interface bus, receiving a response packet with respect to the request packet from the another node, extracting a data portion from the response packet, and transferring the extracted data portion to said external device; and;
- wherein said data processing circuit comprises a first storage device and a second storage device, stores the generated request packet in the first storage device, transmits the stored request packet to the serial interface bus at a predetermined timing, stores the received data in the second storage device, and transfers the stored received data at a predetermined timing; and
- wherein said data processing circuit receives a response packet with respect to a transmission packet from said another node and, when normal, transmits the next transmission packet to said serial interface bus.

25. A serial interface circuit as set forth in claim 24, further comprising a control circuit for receiving a control packet from another node and starting up the data processing circuit when the content of the control packet indicates a request for transfer of data from its own node to the another node and when it indicates a request for transfer of data of the another node to its own node.

26. A serial interface circuit as set forth in claim 25, further comprising a demultiplexing circuit for receiving a packet transferred from another node through the serial interface bus, outputting the same to the control circuit when the received packet is a control packet, and outputting the same to the data processing circuit when the received packet is a response packet with respect to a transmission packet.

27. A serial interface circuit as set forth in claim 26, further comprising a reception use storage device between said demultiplexing circuit and control circuit, said demultiplexing circuit storing the demultiplexed control packet in said reception use storage device, and said control circuit reading the control packet stored in said reception use storage device.

28. A serial interface circuit as set forth in claim 27, wherein a transmission use storage device is connected to said control circuit, said control circuit stores the control packet in said transmission use storage device, and further comprising a circuit for transmitting a transmission use control packet stored in said transmission use storage device to said serial interface bus at a predetermined timing.

* * * * *